UNITED STATES PATENT OFFICE.

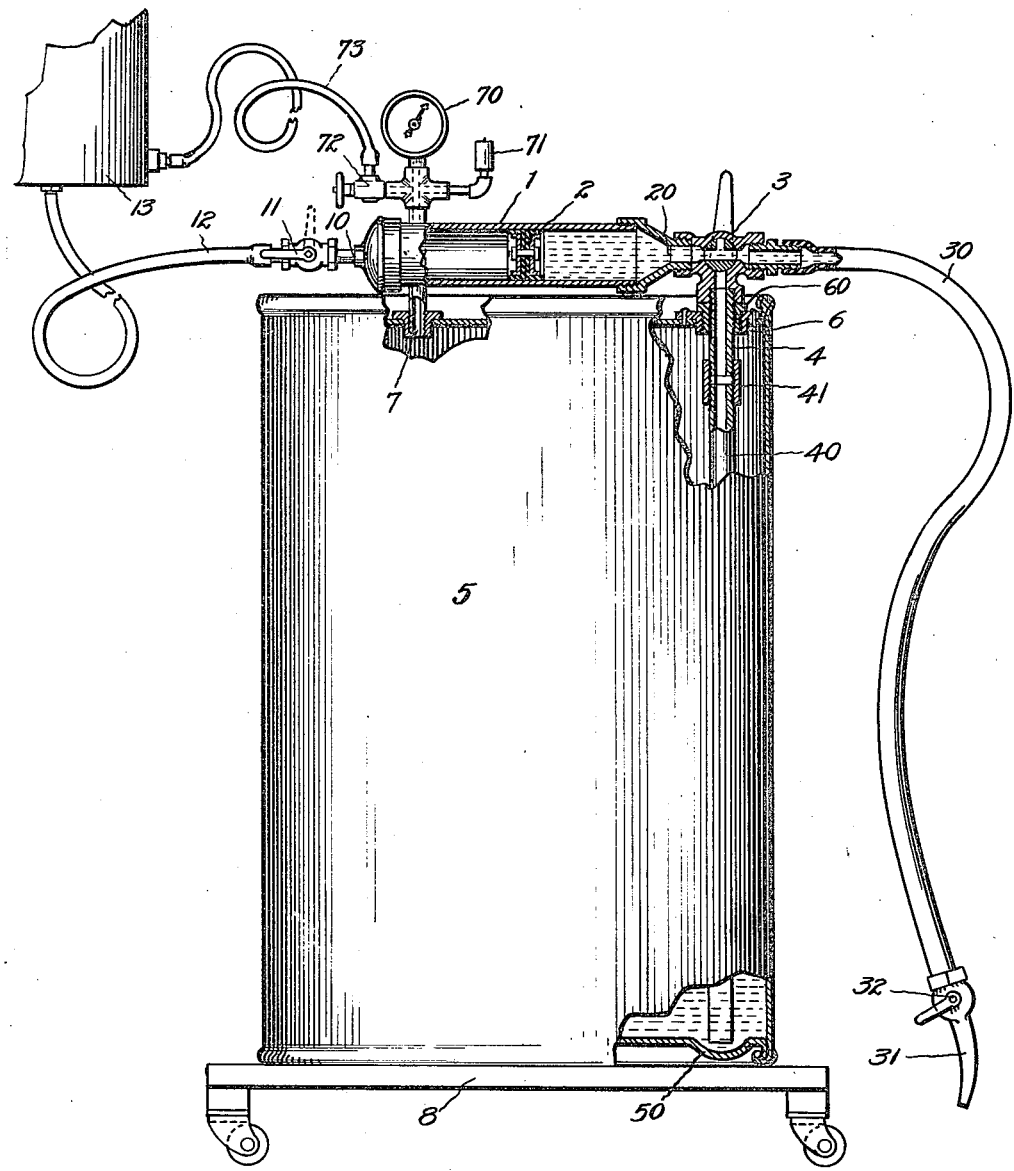

JOSEPH WILMOT THOMPSON, OF CARBONADO, WASHINGTON, ASSIGNOR TO EDWARD DUFFEY, OF SEATTLE, WASHINGTON.

GREASE-GUN ATTACHMENT.

1,339,237. Specification of Letters Patent. Patented May 4, 1920.

Application filed May 1, 1919. Serial No. 293,914.

*To all whom it may concern:*

Be it known that I, JOSEPH WILMOT THOMPSON, a citizen of the United States, and resident of Carbonado, Pierce county, Washington, have invented certain new and useful Improvements in Grease-Gun Attachments, of which the following is a specification.

My invention relates to means employed for placing grease or similar pasty, or semifluid materials into containers. The particular purpose for which this device has been designed, is for use in what is known by the trade as grease guns; that is devices which are employed for filling transmission and differential cases of automobiles with grease.

The object of my invention is to provide a device of this character which may be applied to containers in which the grease is shipped, instead of having a separate grease container permanently secured to the gun, into which the grease must be transferred from the shipping container. In other words, the object of this device is to make a grease gun which may be used as an attachment to, rather than a permanent fixture upon a container.

The features of my invention, which I deem to be new and upon which I desire to obtain a patent, will be herein described and then defined by the claims. In the accompanying drawings I have shown my device in the form of construction which I prefer to use, and as attached in the preferred manner to a particular kind of container. It will, however, be evident that the device may be varied in details and also that the type of container and manner of attaching it thereto, may also be varied.

The drawing shows an elevation of the container having parts of the walls thereof broken away and having my device attached thereto, the device itself being shown in section.

The grease gun employs a cylinder 1, having therein a piston 2. This is a floating piston, that is, it has no piston rod extending outside of the cylinder. To one end of the cylinder is connected an air supply pipe 10. This pipe is provided with valve 11, of any suitable type, by which the supply of air to the cylinder may be controlled. This valve may be connected in any suitable manner with a source of supply of air under pressure. I have illustrated a pipe 12 as connecting it with tank 13, which is supposed to contain air under pressure.

At the opposite end of the cylinder is the grease receiving and discharging opening 20. To this is connected a three-way valve 3. This three-way valve has one branch connected with a pipe 4 which extends through an opening provided in the wall of the grease container 5. It also has the third branch connected with a hose 30 which has a nozzle 31 controlled by valve 32, by means of which the grease is discharged into the gear case, or wherever it is desired to place it.

The pipe through which the grease is drawn from the container 5, should preferably be made in such manner that it may be adjusted somewhat in length, and should also be provided with means whereby it may be securely attached to the container. As illustrated, a short section of pipe 4 is directly secured to the three-way valve. This pipe is exteriorly threaded and has, mounted upon this threaded portion, a collar 60. The head of the container has a washer or collar, 6 fixedly secured thereto and interiorly threaded to receive the sleeve or collar 60. It is thus possible to secure the pipe 4 fixedly and in a tight manner in the head of the container 5.

An extension is provided for the pipe 40, of sufficient length to reach to the bottom of the container. I prefer, also, to provide the bottom of the container with a slight depression, as shown at 50, into which the end of pipe 4 may project, in order to more thoroughly secure the complete discharge of the grease. The extension 40 is connected with the pipe 4 by means of an ordinary collar or coupling 41.

It is possible by turning the pipe 40 more or less into the coupling 41, to minutely adjust the length of the connected pipe and thus to insure that the end of the pipe 50 be brought very close to the bottom of the container, and yet have sufficient clearance to permit free ingress of the grease.

In using this attachment upon a container, it is necessary to provide some means whereby air under pressure may be admitted to the container, to thereby force the grease gun. I, therefore, provide means for the connection of an air supply pipe 7. This pipe is connected, through a valve 72 and a hose 73, with the source of supply of air under pressure, the same being herein represented by the tank 13. I also prefer to secure to this pipe a pressure gage 70 having a blow-off, or relief valve 71. The gage is to indicate the amount of pressure which is contained in the tank or container 5, and the blow-off or relief valve 71 to insure that the pressure in the container shall at no time exceed a safe limit.

With the attachment above described, it is intended to use shipping containers for the grease, so constructed that they may be used as the dispensing tank. They should, therefore, be capable of sustaining the slight interior pressure which is necessary in order to cause the grease to freely flow into the grease gun when the three-way valve is set so as to make connection between said cylinder and the container. This pressure need not exceed ten pounds to the square inch.

In the operation of my device, the attachment is first secured to the container, and also the air supply is connected with the container. The valve 72, controlling the air supply to the container, is opened until the pressure in the container reaches the desired amount, say ten pounds to the inch. The three-way valve 3, is then set so as to make communication between the cylinder 1 and the container 5. The grease will thus be caused to flow through the pipes 40 and 4 and valve 3, to the cylinder of the grease gun. The piston 2 will thus be forced to the end of the cylinder opposite the valve 3 and the cylinder be filled with a measured quantity of the grease. When the cylinder has been filled, the three-way valve is turned so as to make free communication between the grease gun and the discharge hose 30. The valve 11, which controls the supply of air to the opposite end of the cylinder is then opened, and consequently the air, acting upon the piston 2, gradually forces it to the opposite end of the cylinder, discharging the grease through the hose 30 and nozzle 31 into the differential casing, or wherever it is desired to place it. This operation may be repeated as many times as necessary. The cylinder 1 is designed to be made of a known capacity, so that the amount of grease supplied may be determined by the number of times it has been filled and discharged.

For convenience in moving this device about, it may be mounted upon a low truck, such as is shown at 8. This enables the apparatus to be moved wherever desired. While I have shown two separate air supply pipes 12 and 73 as connecting with the air tank, or other source of supply of air under pressure, it is evident that a single pipe would be sufficient for this purpose.

By providing an attachment of this nature and using grease containers which are supplied with means for attaching the same thereto, a simple and economical oufit is provided for dispensing this type of grease. The cost of supplying attaching means to the container will be small. The expense of providing the means for dispensing the grease, namely the grease gun, will also be reduced in cost. The working efficiency of a device of this sort should be equal to that of other more complicated devices.

What I claim as my invention is:

1. A grease gun attachment for grease containers comprising a cylinder with a piston therein, an air supply connection with one end of the cylinder, a three-way valve having one end connecting with the other end of the cylinder, a grease supply pipe adapted to enter the grease container and connected with another end of the said valve, and a grease discharge pipe connected with the third end of the valve.

2. A grease dispensing device comprising a cylinder, a piston therein, an air supply connection with one end of the cylinder, a grease supply pipe adapted to be secured to and entering the container, a grease discharge pipe and a three-way valve connecting the grease receiving end of the cylinder and said pipes, and means for supplying air under pressure to the container.

Signed at Seattle, King county, Washington, this fifth day of April, 1919.

JOSEPH WILMOT THOMPSON.